United States Patent
Schwarz et al.

(10) Patent No.: US 12,059,935 B1
(45) Date of Patent: Aug. 13, 2024

(54) VEHICLE SAFETY SYSTEM, AND COMPONENTS THEREFOR

(71) Applicants: Henry Schwarz, Grand Rapids, MI (US); Dan Schwarz, Wyoming, MI (US)

(72) Inventors: Henry Schwarz, Grand Rapids, MI (US); Dan Schwarz, Wyoming, MI (US)

( * ) Notice: Subject to any disclaimer, the term of this patent is extended or adjusted under 35 U.S.C. 154(b) by 0 days.

(21) Appl. No.: 18/528,129

(22) Filed: Dec. 4, 2023

Related U.S. Application Data (60) Provisional application No. 63/523,727, filed on Jun. 28, 2023.

(51) Int. Cl.
  B60D 1/64 (2006.01)
  G07C 5/08 (2006.01)

(52) U.S. Cl.
  CPC ............. B60D 1/64 (2013.01); G07C 5/0825 (2013.01); G07C 5/0833 (2013.01)

(58) Field of Classification Search
  None
  See application file for complete search history.

(56) References Cited

U.S. PATENT DOCUMENTS

| | | | |
|---|---|---|---|
| 3,554,230 A | 1/1971 | Berg | |
| 4,097,840 A * | 6/1978 | Chappelle | B60S 9/04 280/766.1 |
| 4,227,239 A * | 10/1980 | Boyer | H02B 1/202 361/825 |
| 4,278,226 A | 7/1981 | Horowitz | |
| 4,366,965 A | 1/1983 | Rhodes | |
| 4,738,641 A | 4/1988 | Eversole, Jr. | |
| 4,845,593 A * | 7/1989 | Brown | H01R 13/707 340/687 |
| 4,916,621 A * | 4/1990 | Bean | G08G 1/0133 340/908 |
| 5,421,600 A * | 6/1995 | Jones | B60D 1/36 280/428 |
| 5,443,389 A * | 8/1995 | Hughes | B60D 1/64 439/651 |
| 5,660,408 A | 8/1997 | Johnson | |
| 5,677,667 A | 10/1997 | Lesesky et al. | |
| 5,988,569 A | 11/1999 | Zhang et al. | |
| 6,033,174 A * | 3/2000 | Alexander | B65G 69/003 414/401 |

(Continued)

FOREIGN PATENT DOCUMENTS

| EP | 3501956 A1 | 6/2019 |
|---|---|---|
| WO | 2017171911 A1 | 10/2017 |

*Primary Examiner* — Daniel L Greene
(74) *Attorney, Agent, or Firm* — Gardner, Linn, Burkhart & Ondersma LLP (57) ABSTRACT

An electronic safety system for preventing vehicle damage during the disconnection of a pulling portion of a vehicle from its towed portion, such as a trailer, has been disclosed. The safety system monitors a series of safety conditions on the pulling portion and optionally on the towed portion of the vehicle. When the safety conditions are met, the coupler, such as a fifth wheel or ball hitch, disconnect function is enabled. When the safety conditions are not met, the coupler disconnect function is disabled and, optionally, the vehicle operator is alerted to the unsafe configuration of the vehicle.

23 Claims, 7 Drawing Sheets

(56) References Cited

U.S. PATENT DOCUMENTS

| | | | |
|---|---|---|---|
| 6,250,650 B1* | 6/2001 | Douglas | B60S 9/08 |
| | | | 280/475 |
| 6,285,278 B1* | 9/2001 | Schutt | B62D 53/12 |
| | | | 340/686.2 |
| 7,021,334 B1* | 4/2006 | Helmer | B60D 1/64 |
| | | | 280/421 |
| 7,548,155 B2* | 6/2009 | Schutt | B60D 1/36 |
| | | | 340/687 |
| 7,643,271 B2 | 1/2010 | Phillips et al. | |
| 8,192,216 B1 | 6/2012 | Puluc et al. | |
| 9,300,080 B2 | 3/2016 | Puluc | |
| 10,029,747 B2 | 7/2018 | Keatley et al. | |
| 10,377,198 B1 | 8/2019 | Fields | |
| 10,421,325 B2 | 9/2019 | Keatley et al. | |
| 10,661,622 B2 | 5/2020 | Keatley et al. | |
| 10,676,142 B2 | 6/2020 | Hungerink et al. | |
| 10,850,782 B2 | 12/2020 | Keatley et al. | |
| 11,046,298 B1* | 6/2021 | Desmarais | G01G 19/021 |
| 11,376,907 B2 | 7/2022 | Keatley et al. | |
| 2004/0029456 A1* | 2/2004 | Bure | B60D 1/62 |
| | | | 439/894 |
| 2005/0073141 A1* | 4/2005 | Baird | B60P 1/56 |
| | | | 280/766.1 |
| 2006/0181391 A1* | 8/2006 | McNeill | G05B 15/02 |
| | | | 340/5.61 |
| 2007/0035370 A1* | 2/2007 | Habboosh | H01H 36/0046 |
| | | | 335/205 |
| 2016/0361959 A1* | 12/2016 | Keatley | B60D 1/64 |
| 2017/0190276 A1* | 7/2017 | Plumski | B60P 3/228 |
| 2018/0022325 A1* | 1/2018 | Garceau | B60S 9/02 |
| | | | 180/41 |
| 2021/0048141 A1* | 2/2021 | Kimener | B65G 69/003 |
| 2021/0206218 A1* | 7/2021 | Muddasani | B62D 33/0273 |
| 2021/0272397 A1* | 9/2021 | Forster | B62D 53/085 |
| 2021/0276382 A1* | 9/2021 | Kondikoppad | B60D 1/62 |
| 2022/0118854 A1* | 4/2022 | Davis | B60W 10/08 |
| 2022/0288985 A1 | 9/2022 | Keatley et al. | |
| 2022/0332158 A1* | 10/2022 | Layfield | B60D 1/64 |
| 2023/0030953 A1* | 2/2023 | Oberlander | A01B 59/002 |
| 2023/0041140 A1 | 2/2023 | Bean et al. | |
| 2023/0072266 A1* | 3/2023 | Steel | G06K 7/10366 |
| 2023/0092680 A1* | 3/2023 | Heitzmann | G07C 5/0825 |
| | | | 280/6.153 |
| 2023/0347997 A1* | 11/2023 | Dunkle | B60D 1/62 |

\* cited by examiner

VEHICLE SAFETY SYSTEM, AND COMPONENTS THEREFOR

CROSS REFERENCE TO RELATED APPLICATION

This application claims the benefit of provisional U.S. application, Ser. No. 63/523,727, filed on Jun. 28, 2023, which is incorporated by referenced herein in its entirety.

TECHNICAL FIELD AND BACKGROUND

The disclosed safety system consists of both mechanical and electrical hardware whose purpose is to detect unsafe operating conditions that exist in a vehicle with a pulling portion and a towed portion, such as commercial tractor and trailer. The system prohibits improper vehicle disconnection procedures and notifies the vehicle operator of unsafe vehicle conditions that must be rectified.

The improper disconnection of a towed portion, such as a trailer, from the pulling portion of a vehicle can often result in costly damage. When the pulling portion is disconnected from the towed portion without following the proper procedure, the brake and power lines can be damaged as the towed portion is separated. In addition to the practical considerations of preventing damage to the pneumatic and electrical lines of a pulling portion, there are also legal requirements for safely constraining the lines. The Federal Motor Carrier Safety Administration regulation chapter 5.1.1, part 393.45 requires the protection of pneumatic brake hoses from both mechanical damage and high exhaust temperatures. The towed portion is also prone to damage when the landing gear is not extended during separation, especially when fully loaded. For example, when a fully loaded towed portion, such as a trailer, falls to the ground with the landing gear retracted, the landing gear can collapse under the impact. In recent years, the introduction of pneumatically actuated fifth wheels to the market has increased the likelihood that one of these damage modes may occur.

Pneumatically actuated fifth wheels provide the benefit of eliminating the 60-100 lbs. strain to the vehicle operator's shoulder that occurs when disconnecting a towed portion's kingpin from a lever actuated fifth wheel. Pneumatic actuation allows the vehicle operator to disconnect the pulling portion from the towed portion while remaining inside the cab instead of exiting the cab to pull a kingpin release lever on the fifth wheel.

The greatest drawback of pneumatically actuated fifth wheels is the removal of the vehicle operator from the process of disconnecting the kingpin. While the vehicle operator is in the cab of the pulling portion, they are unable to inspect the safety conditions of both vehicles while the kingpin is being released.

SUMMARY OF THE DISCLOSURE

The present disclosure describes a vehicle with an electronic safety system that monitors safety conditions of the vehicle while the operator is unable to do so. The system includes a bracket that is configured to mount to the pulling portion of the vehicle and is configured to constrain the connectors of lines, such as the pneumatic brake lines and electrical power lines, of the pulling portion and a controller. The controller monitors proximity switches, such as reed switches, mounted to the bracket to detect when the line connectors are constrained to the bracket using magnets attached to the connectors.

In one embodiment, a bracket assembly is provided with a bracket with at least one receptacle to constrain an electrical connector or a pneumatic connector of a pulling portion, which is configured to fasten to the pulling portion either directly or indirectly and at least one proximity switch affixed to the bracket adjacent the receptacle such that the presence of a connector in the receptacle is detected when properly constrained.

In one aspect, the bracket assembly includes a plurality of the receptacles, each for receiving a connector, and a plurality of proximity switches, which detect when the connectors are properly inserted in the receptacles of the bracket.

For example, suitable proximity switches may comprise reed switches. The connectors may each have a magnet affixed thereto such that the reed switches are closed when the connectors are inserted in the receptacle and the magnets are substantially adjacent to the reed switches.

In a further aspect, the connectors may be formed from a non-ferromagnetic material such that the strength of the magnetic field generated by the magnets affixed to the connectors is not limited by the connector.

In another aspect, the receptacles of the bracket are molded with the bracket so that the receptacles of the bracket are formed as a single molded part. Optionally, the bracket also has supports molded therewith for supporting the proximity switches adjacent the respective receptacles.

In another aspect, the bracket assembly further includes a trough, such as a molded trough, fastened to the bracket such that the wires of the proximity switches can be routed on the bracket by the trough and protected from damage.

In yet a further aspect, the bracket assembly includes a multi-pin connector, with the wires of the proximity switches terminating at the multi-pin connector.

In another embodiment, a controller for a vehicle safety system is configured to receive input from a plurality of proximity switches mounted to a vehicle and to disable disconnection of a connection between a pulling portion and a towed portion of the vehicle when the controller detects the vehicle is in an unsafe configuration based on input from the proximity switches.

For example, in one aspect, the vehicle includes a solenoid that releases the towed portion from the connection between the pulling portion and the towed portion of the vehicle. When the controller detects the vehicle is in a safe configuration based input from the proximity switches, the controller enables the solenoid to release between the pulling portion and the towed portion of the vehicle but disables the solenoid when the controller detects the vehicle is in an unsafe configuration based input from the proximity switches connection.

In a further aspect, the controller is configured to power an indicator to indicate when the solenoid is disabled. For example, the indicator may be an audible indicator, such as a buzzer.

In yet another aspect, the controller is configured to power an indicator to indicate when the proximity switches sense when the connectors are properly inserted in the receptacles of the bracket. For example, the indicator may be a visual indicator, such as a light.

In yet other aspects, the proximity switches are reed switches, and the reed switches detect magnets mounted to connectors when the magnets are substantially adjacent to the reed switches.

In other aspects, the safety system may include one or more indicators to indicate the disabled state of the solenoid. For example, the indicator may be an audible indicator or a visual indicators.

Optionally, the physical location of the controller is substantially adjacent to or within a power receptacle of the pulling portion of the vehicle.

In another form, the physical location of the controller may be substantially adjacent to or within at least one of an existing OEM control system of the pulling portion or a power distribution system of the pulling portion of the vehicle.

In yet other aspects, the controller may be configured to detect a raised state or a lowered state of a landing gear of the towed portion of the vehicle. For example, the controller may be in communication with a proximity switch that detects the raised a lowered state of the landing gear.

In yet another embodiment, the controller may be configured to detect when a parking brake or a wheel chock is set.

In another aspect, the solenoid configuration may be configured to use electric power to release the connection between the towed portion and the pulling portion of the vehicle only in the absence of pneumatic power.

Another characteristic of this system's design is its simple and unlimited expandability, as more fully described below. Many additional safety conditions may be monitored with minimal increase to cost and system complexity. For example, as noted above and more fully described below, the towed portion landing gear status and/or a chock status and/or brake status may also be monitored to determine when the vehicle is in a safe configuration.

All of the safety status inputs are collected and analyzed by the controller to enable or disable the release of the coupler, such as a fifth wheel's kingpin release switch. For example, if the operator tries to use the kingpin release switch when the vehicle is in an unsafe configuration, they may be notified by an indicator, such as a buzzer, that the safety hazard must be corrected before the fifth wheel's kingpin release switch is enabled.

DETAILED DESCRIPTION

Figure 1:
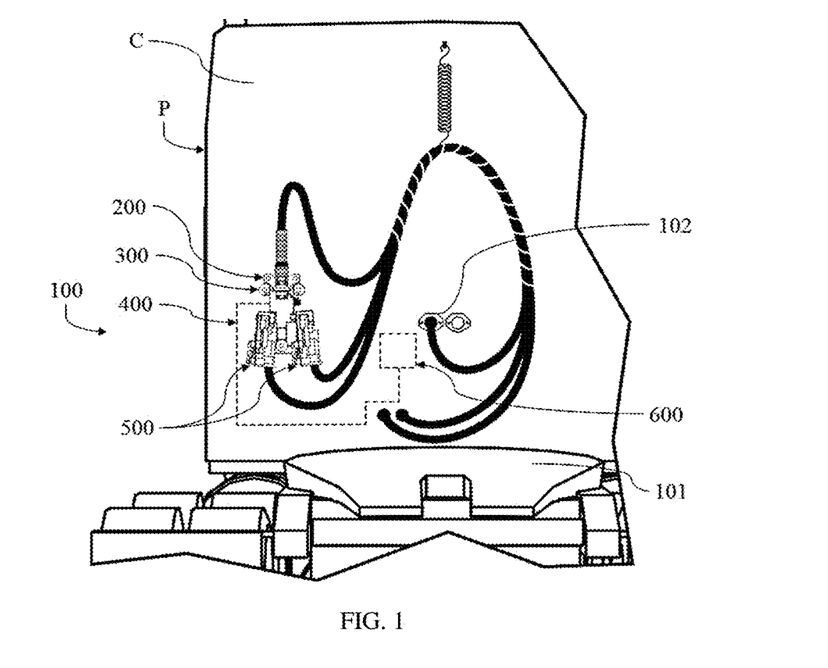
FIG. 1 is a rear view of a pulling portion with a disclosed safety system.

Referring to FIG. 1, the numeral 100 generally designates a safety system for a vehicle, which includes a pulling portion P and a towed portion (not shown). As will be more fully described below, safety system 100 is configured to monitor the status of the vehicle and confirm that the pulling portion P, and in some embodiments that the towed portion of the vehicle, is in a safe configuration prior to disconnecting the towed portion from the pulling portion P of the vehicle.

Referring again to FIG. 1, in one embodiment, safety system 100 is configured to monitor the status of various lines, which in normal operation are connected between the pulling portion of vehicle and the towed portion of the vehicle but then are disconnected from the towed portion and constrained at the pulling portion when the towed portion is to be disconnected so that the vehicle is in a safe configuration for disconnecting the towed portion. The safety system 100 described herein is configured to detect when the pulling portion lines are not properly constrained at the pulling portion of the vehicle and configured to prohibit improper disconnection of the towed portion of the vehicle and, further, optionally notify the vehicle operator of unsafe conditions that must be rectified prior to disconnection of the towed portion. As will be more fully described below, in other embodiments, safety system 100 may be configured to monitor other conditions that are an indication that the vehicle is in a safe configuration, such as the status of landing gear of the towed portion and/or of a chock. Further, the safety system may configured to generate notifications to the vehicle operator when the vehicle is not in a safe configuration.

Referring again to FIG. 1, safety system 100 of pulling portion P of the vehicle includes a bracket assembly 300, which is mounted to the pulling portion P, for example to the back of the cab C, and is configured to constrain the line connectors 200, 500 for the lines that must be disconnected and constrained prior to disconnecting the towed portion from the pulling portion of the vehicle. Safety system 100 is further configured to detect when the line connectors are constrained by the bracket assembly 300. In other words, safety system 100 is configured to monitor the constrained status of the line connectors 200, 500 at bracket assembly 300. When the line connectors 200, 500 are properly constrained at bracket assembly 300, as more fully described below, safety system 100 will consider the vehicle to be in a safe configuration and will allow the towed portion to be disconnected from the pulling portion P of the vehicle.

Figure 9:
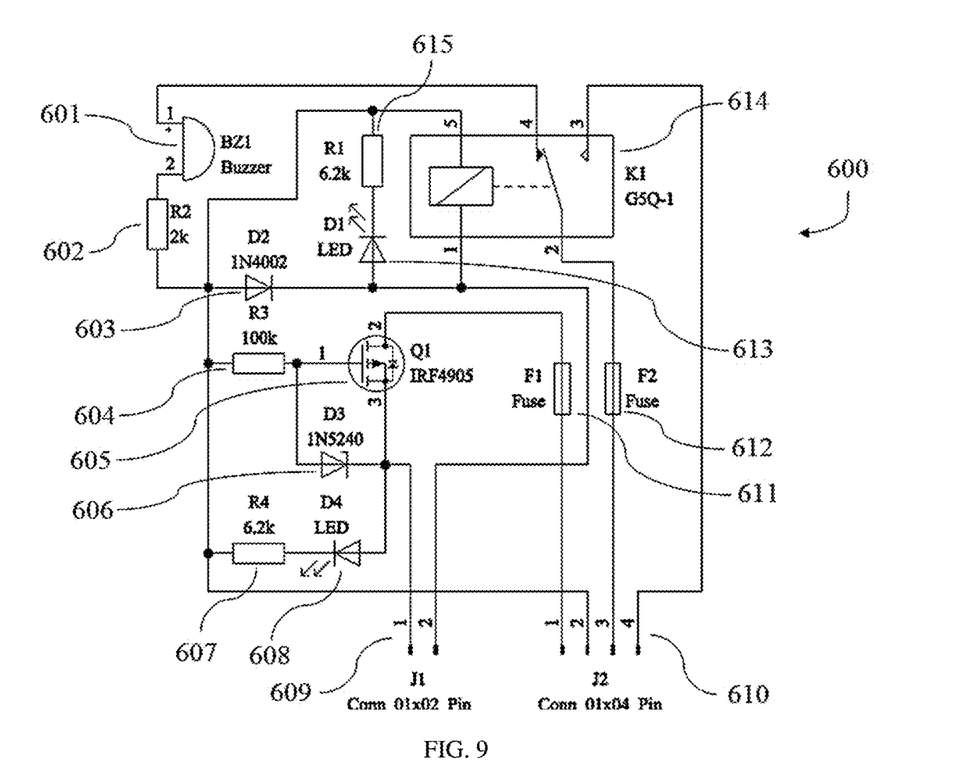
FIG. 9 is an electrical schematic of the controller of the safety system.
Figure 10:
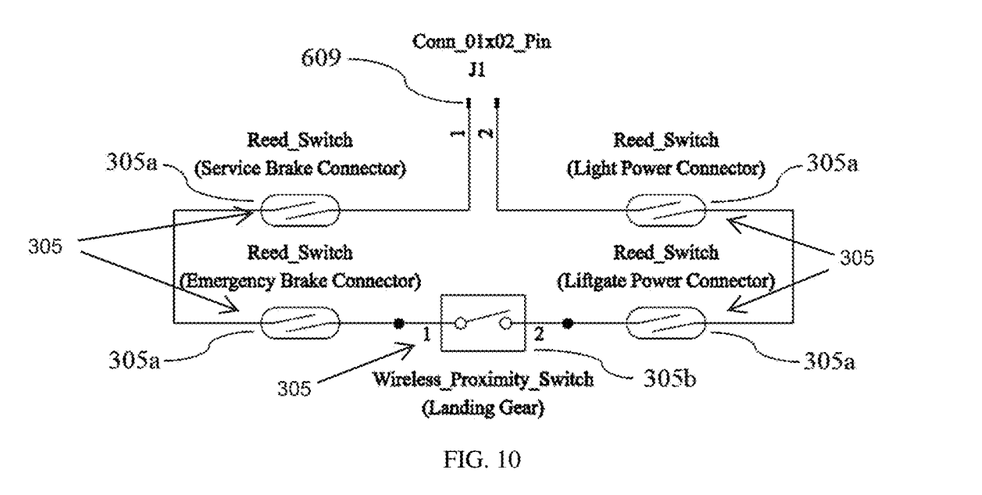
FIG. 10 is an electrical schematic of a circuit of the proximity switches of the safety system.

Referring to FIGS. 9 and 10, safety system 100 includes a controller 600 that is in communication with proximity switches 305, such as reed switches 305*a*, that monitor the constrained status of the line connectors 200, 500 so that the controller 600 can monitor when the line connectors 200, 500 are properly constrained by bracket assembly 300. Proximity switches 305 are mounted at bracket assembly 300 and are in communication with controller 600 and may be electrically coupled to controller 600. "Controller" as used herein is used broadly to include a microprocessor based controller, and memory, for processing instructions or for processing an algorithm stored in memory to control operation of the vehicle. The controller 600 may comprise one or more microcontrollers, field programmable gate arrays, systems on a chip, discrete circuitry, and/or other suitable hardware, software, or firmware that is capable of carrying out the functions described herein. Optionally, proximity switches 305 are electrically coupled to controller 600 via a wire harness 400. Alternately, proximity switches 305 may be in wireless communication with controller 600. For example, proximity switches 305 may be electrically coupled to transmitters, which then wirelessly transmit the signals from proximity switches 305 to controller 600.

As noted above, bracket assembly 300 is designed to constrain one or more connectors, such as an electrical line connector 200 and a pair of pneumatic connectors 500, when the towed portion of the vehicle is disconnected from the pulling portion P of the vehicle, and for example, from a coupler, such as a ball hitch or fifth wheel 101 mounted to the pulling portion P of the vehicle. The safety signal is only transmitted by the bracket assembly 300 when the electrical line connectors 200 and the pneumatic line connectors 500 are properly constrained in bracket assembly 300. Once the controller 600 receives the safety signal, the controller 600 enables disconnection of the towed portion from the pulling portion P, such as the fifth wheel. Hereinafter reference will be made to the fifth wheel, but it should be understood that a ball hitch type coupler may be used depending on the application.

Figure 2:
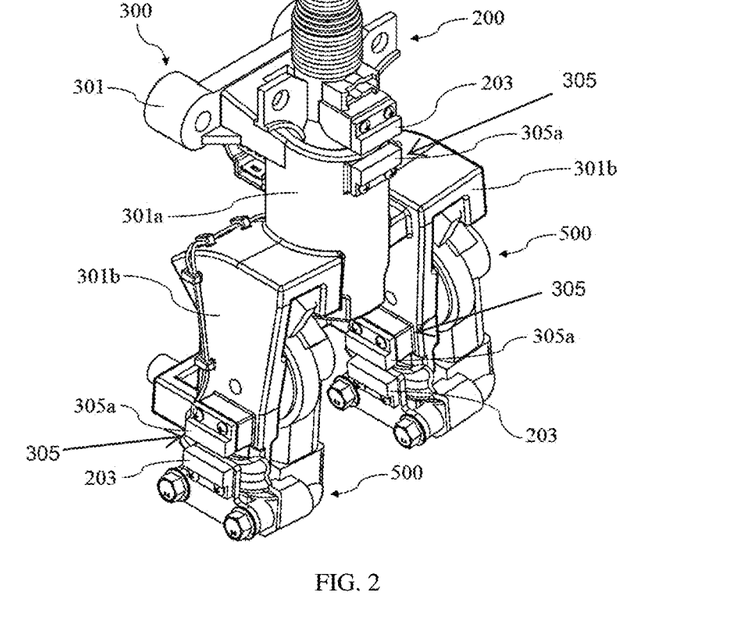
FIG. 2 is an isometric view of an electrical connector and a pneumatic connector pair constrained in a bracket.

Referring to FIG. 2, the bracket assembly 300 includes a bracket 301 with a plurality of receptacles 301a, 301b for the electrical line connector 200 and the pneumatic line connectors 500. The reed switches 305a are mounted adjacent a respective receptacle. The receptacle 301a, hereinafter referred to as the electrical line connector receptacle 301a, is a cylindrical body with a keyed cylindrical cavity, which is formed with or mounted to the bracket 301. For example, the cylindrical body may be formed with bracket 301 by molding so as to form a unitary molded bracket. Electrical line connector receptacle 301a is configured to constrain the electrical line connector 200 to limit one or more degrees of freedom of the electrical line connector. In the illustrated embodiment, electrical line connector receptacle 301a is configured to limit two degrees of freedom in translation and three degrees of freedom in rotation of the electrical line connector 200 so that the connector has only one degree of freedom. The remaining unrestrained degree of freedom in translation allows the operator to insert the electrical line connector 200 into its receptacle in a downward vertical motion, and similarly remove the electrical line connector 200 with a reverse movement.

Receptacles 301b, herein after referred to as the pneumatic line connector receptacles 301bs, are formed from inverted J-shape arms formed with or mounted to the bracket 301 about electrical line connector receptacle 301a that also limit one or more degrees of freedom of the pneumatic line connector 500. For example, the inverted J-shaped arms may also be formed with bracket 301 by molding so as to form a unitary molded bracket. In the illustrated embodiment, pneumatic line connector receptacles 301b limits three degrees of freedom in translation and two degrees of freedom in rotation of the pneumatic line connector 500. The remaining, unrestrained degree of freedom in rotation allows the operator to cam the pneumatic line connector 500 into its receptacle in a downward twisting motion. Removing each pneumatic line connector requires the opposite motions from insertion.

To detect the proper constraint of each connector, each connector 200, 500 is provided with a magnet 203. Thus, when the electrical line connector 200 and the pneumatic line connectors 500 are constrained properly in the receptacles of the bracket 301, the reed switch 305a attached to bracket 301 adjacent the respective receptacle 301a or 301b will be adjacent to the respective magnet 203 on each connector 200, 500. When the north and south poles of the magnet 203 are sufficiently close in proximity to the respective reed switch 305a, the magnetic field will attract the reeds together and allow electrical current to pass through the switch. In this case, the electrical current passing through the reed switch 305a is the safety signal, which is transmitted to controller 600. Given that each reed switch 305a is a type of proximity switch that consists of a hermetically sealed enclosure with ferromagnetic reeds inside, the reed switches 305a can be used in the operating environment of the vehicle without requiring an enclosure or housing about bracket assembly 300.

Figure 3:
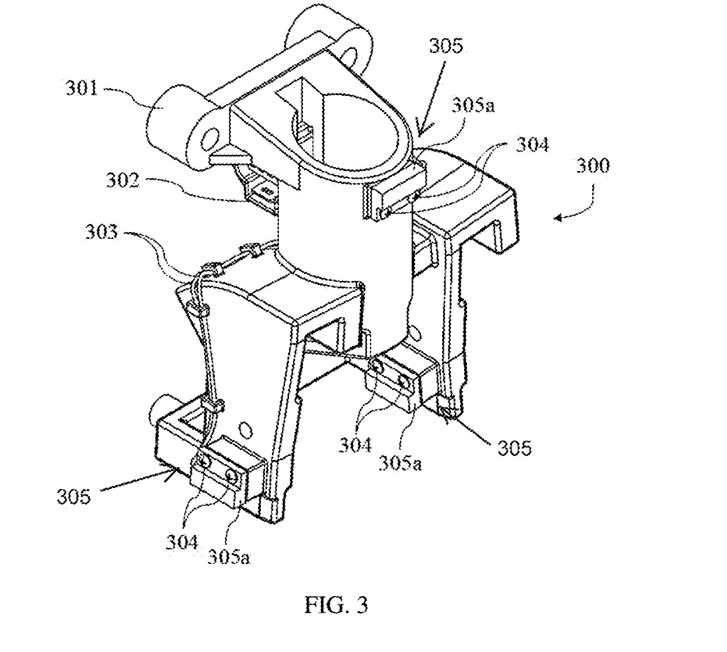
FIG. 3 is an isometric view of the bracket of FIG. 2 with the electrical connector and the pneumatic connectors removed.
Figure 4:
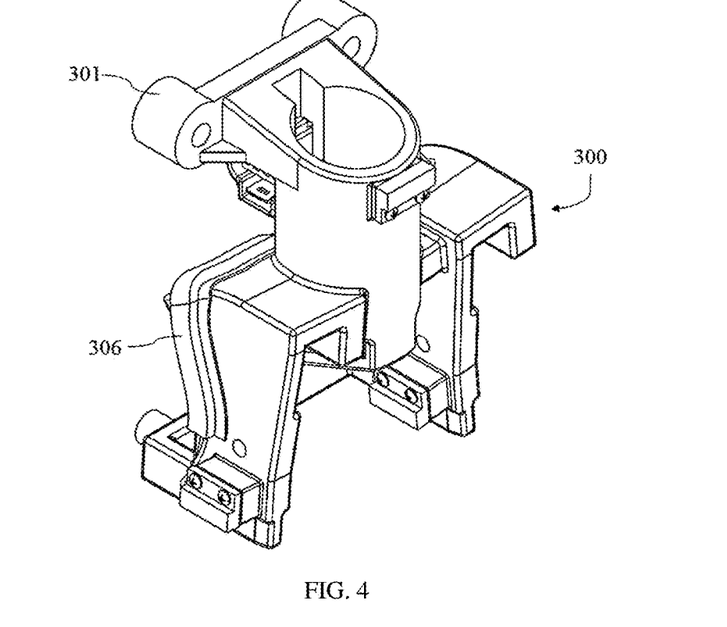
FIG. 4 is an isometric view of the bracket of FIG. 3 with a wire trough.

As best seen in FIG. 3, the safety signals from the proximity switches 305 may then be passed to controller 600 through a wires 303, which may be routed along the surface of the bracket 301 and, further, optionally enclosed by a wire trough 306 (FIG. 4). A suitable wire trough for wire trough 306 may be molded from a polymer, such as plastic. Thus, the wire trough 306 helps protect the wires 303 from damage in service.

Figure 5:
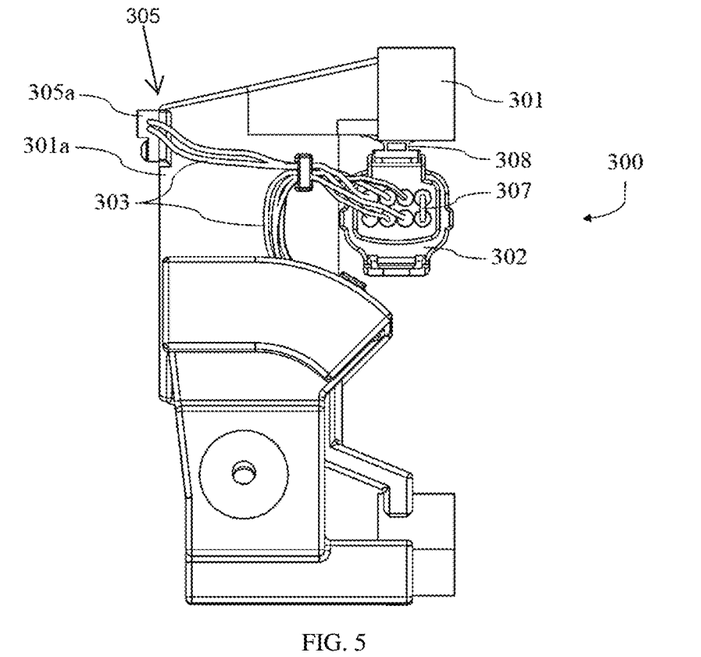
FIG. 5 is a side view of the bracket of FIG. 3 showing a proximity switch wire harness.

As best seen in FIG. 5, each of the wires 303 is terminated in a multi-pin connector 302 that passes the safety signal to the wire harness 400 (FIG. 1). A wire 307 jumper (FIG. 5) is positioned in the last terminal column of the multi-pin connector 302 as a place holder for the wires 303 of an additional proximity switch. A clip 308 holds the multi-pin connector 302 behind the electrical line connector receptacle and pneumatic line receptacles 301a and 301b of the bracket 301 where the multi-pin connector 302 is less likely to be damaged in service.

Figure 6:
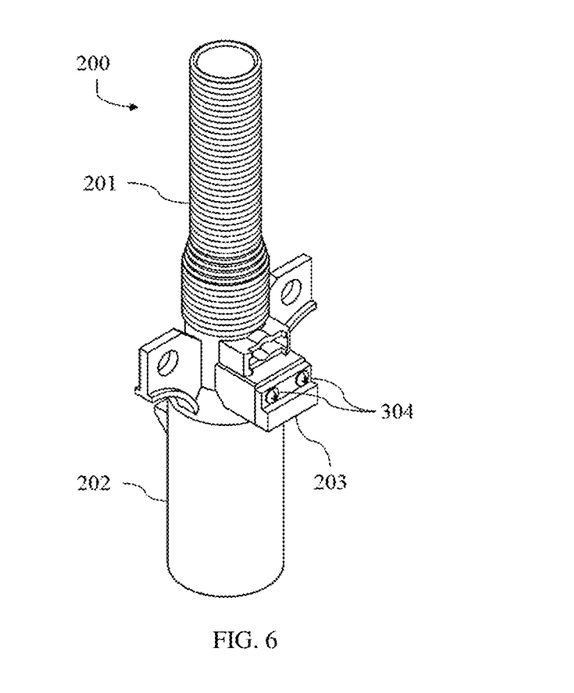
FIG. 6 is an isometric view of the electrical connector with a magnet affixed.

Since a standard configuration of the electrical line connectors 200 will not be detected by the reed switches 305a, a unique component arrangement is required to fasten the magnet 203 to the assembly. Referring to FIG. 6, the standard configuration of the electrical line connector 200 assembly consists of an electrical line connector body 202 and a cable strain relief 201. The unique component arrangement includes the magnet 203 fastened to the electrical line connector body 202 by a pair of fasteners 304, such as screws. The assembly of the electrical line connector 200 optionally consists of non-ferrous components like aluminum and non-magnetic alloys of stainless steel so the strength of the magnetic field is fully utilized.

Figure 7:
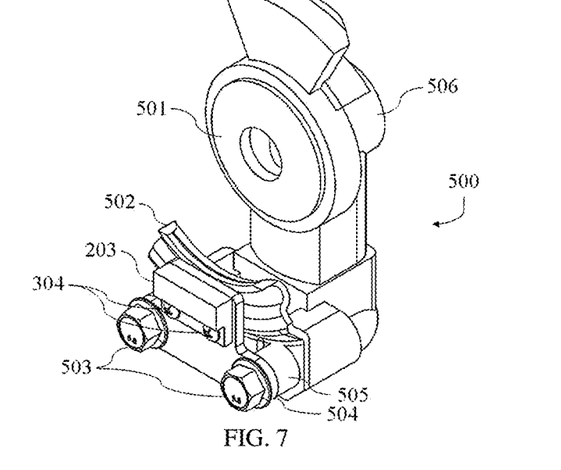
FIG. 7 is an isometric view of the pneumatic connector with the magnet affixed.

Likewise, a standard configuration of the pneumatic line connectors 500 will not be detected by the reed switches 305a, so a unique component arrangement is required to fasten the magnet 203 to each pneumatic line connectors. The standard configuration of the assembly of pneumatic line connector 500 consists of a pneumatic line connector body 506 (FIG. 7), a rubber seal 501, a wear plate 502, and a pair of fasteners 503, such as bolts, that mount the wear plate 502 to body 506. The unique component arrangement includes a pair of spacers 505 and a plate 504 between the fasteners 503 and the wear plate 502. The magnet 203 is fastened to the plate 504 by the pair of fasteners 304, such as screws. The assembly of the pneumatic line connector 500 optionally consists of non-ferrous components like aluminum and non-magnetic alloys of stainless steel so the strength of the magnetic field is fully utilized.

Figure 11:
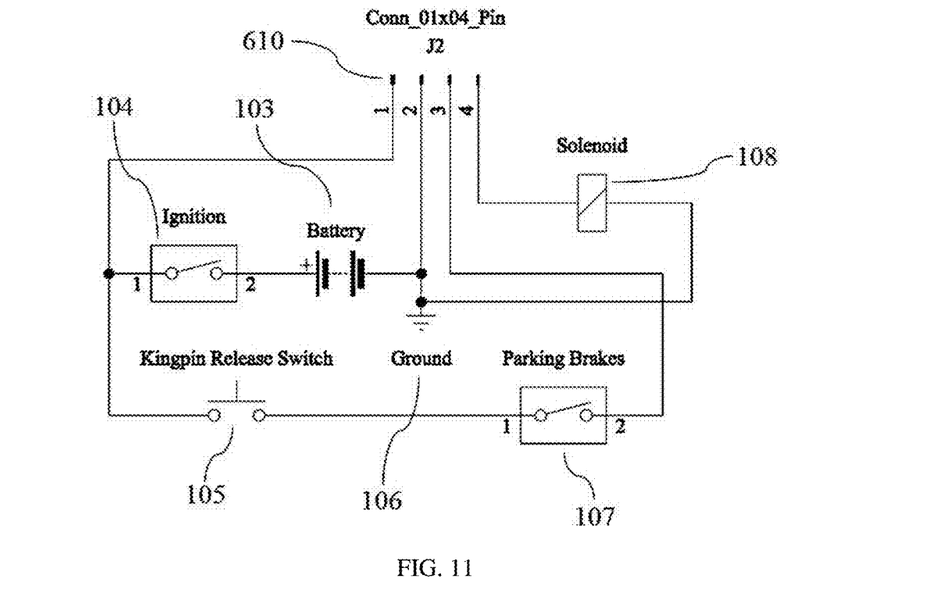
FIG. 11 is an electrical schematic of a control circuit of the pulling portion with a pneumatic fifth wheel.

As best seen in FIG. 11, controller 600 is configured to receive input and generate output to one or more systems on pulling portion P of the vehicle. For example, fifth wheel 101 may have a kingpin release switch 105 (FIG. 11) to actuate a solenoid 108 valve of the fifth wheel 101. If the bracket assembly 300 does not transmit the safety signal to the controller 600 because one of the electrical line connectors 200 or the pneumatic line connectors 500 are not properly constrained in the bracket assembly 300, controller 600 is configured to disable (or not enable) the kingpin release switch 105 and, optionally, will notify the operator that an unsafe condition exists. The safety system's 100 subassemblies are discussed and described in greater detail below, as well as additional inputs to the safety signal that may be added to the safety system 100 configuration.

Figure 8:
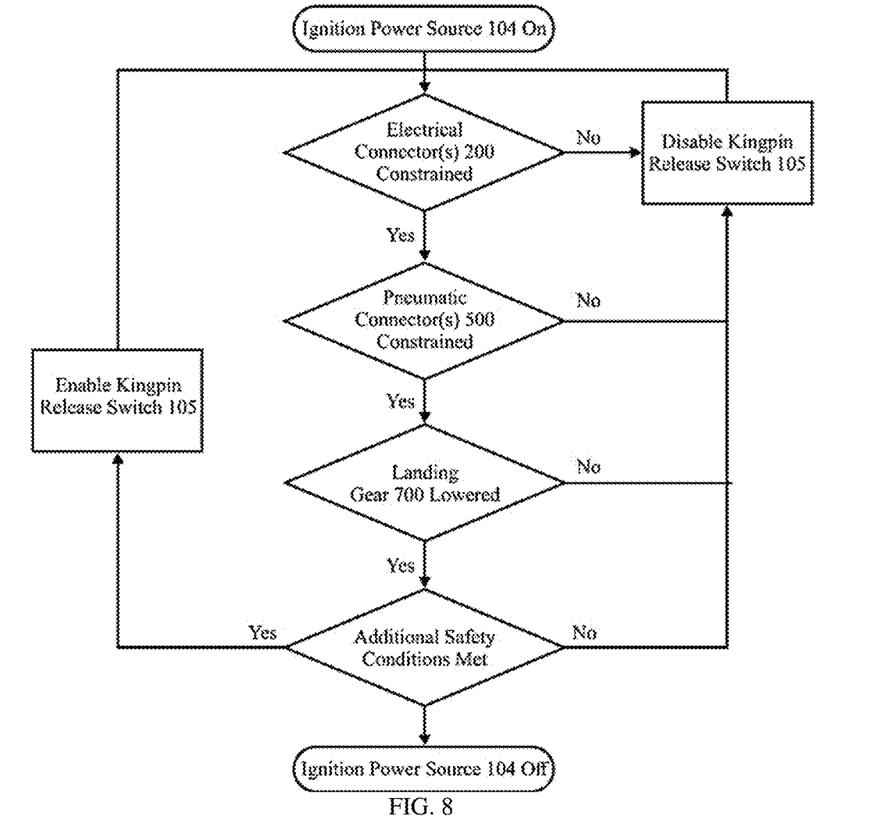
FIG. 8 is a flow chart describing a control algorithm of the safety system.

Referring to FIG. 8, when the ignition power 104 is on the safety system 100 will continuously monitor proximity switch inputs to determine if the electrical line connectors 200 and the pneumatic line connectors 500 are constrained or in use, if a landing gear 700 (FIG. 12) of the towed portion is raised or lowered, and if any other safety conditions are met prior to decoupling the pulling portion from the trailer portion. If all safety conditions are met, the kingpin release switch 105 of the fifth wheel 101 is enabled. But, if any one of the safety conditions are not met, the kingpin release switch 105 is disabled by controller 600. Upon vehicle shut down, the safety system 100 will turn off to preserve battery 103 life. Thus, controller 600 interprets and responds to the safety signal transmitted through the reed switches 305a of the bracket assembly 300. Safety system 100 may have additional safety conditions to evaluate which will be described in greater detail below.

A configuration of the controller 600, which achieves the process steps illustrated in the flow chart of FIG. 8, is described in the schematic diagrams of FIGS. 9-11. An ignition power source 104 (FIG. 0.11) is connected to pin one of a multi-pin connector 610 and a ground 106 is connected to pin two of the multi-pin connector 610. The current supplied from the ignition power source 104 to the controller 600 is limited by a fuse 611 (FIG. 9) and correct polarity is ensured by a MOSFET 605, a resistor 604, and a diode 606. An LED indicator 608 with a resistor 607 is used to indicate the controller's 600 ready status. The multiple proximity switches 305 (FIG. 10) are connected in series between pin one and pin two of a multi-pin connector 609. The series loop of proximity switches will inhibit the kingpin release switch 105 if any proximity switch is not closed. When all of the proximity switches are closed and pass current to pin two of the multi-pin connector 609, a relay 614 coil is energized (FIG. 9). The energized relay 614 coil connects pins three and four of the multi-pin connector 610 which enables the kingpin release switch 105 of the fifth wheel 101. The current supplied by the relay 614 to pins three and four of the multi-pin connector 610 is limited by a fuse 612 and any voltage spikes induced by the relay 614 coil operation are limited by a diode 603. A LED indicator 613 with a resistor 615 is used to inform the vehicle operator when the kingpin release switch 105 is safe to use. If the operator tries to use the kingpin release switch 105 when the proximity switches detect an unsafe condition, a buzzer 601 and a resistor 602 will produce a warning tone to indicate an unsafe operating condition.

One possible configuration of proximity switches 305 connected in series between pin one and pin two of the multi-pin connector 609 is shown in FIG. 10. The circuit has four of the reed switches 305a and a wireless proximity switch 305b to pass the safety signal between pins one and two of the multi-pin connector 609. The safety signal is only passed through the circuit when a service brake connector, an emergency brake connector, a light power connector and a lift gate power connector are all constrained and the landing gear 700 is lowered.

Figure 13:
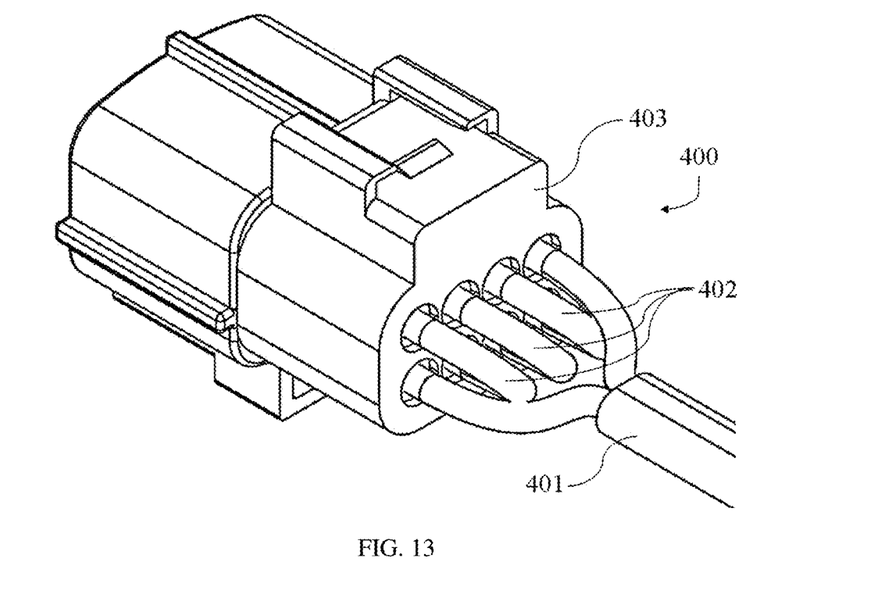
FIG. 13 is an isometric view of a wire harness to transmit a safety signal from the bracket of FIG. 3 to the controller of FIG. 1.

A serial connection between the reed switches 305a of the bracket assembly 300 can be achieved by the wire harness 400 configuration shown in FIG. 13. A cable 401 may provide the safety signal path between the multi-pin connector 609 of the controller 600 and the multi-pin connector 302 of the bracket assembly 300. The safety signal passes through the conductors of the cable 401 and each of the reed switches 305a successively when a multi-pin connector 403 with a wire 402 jumper configuration is connected to the multi-pin connector 302 of the bracket assembly 300.

Figure 12:
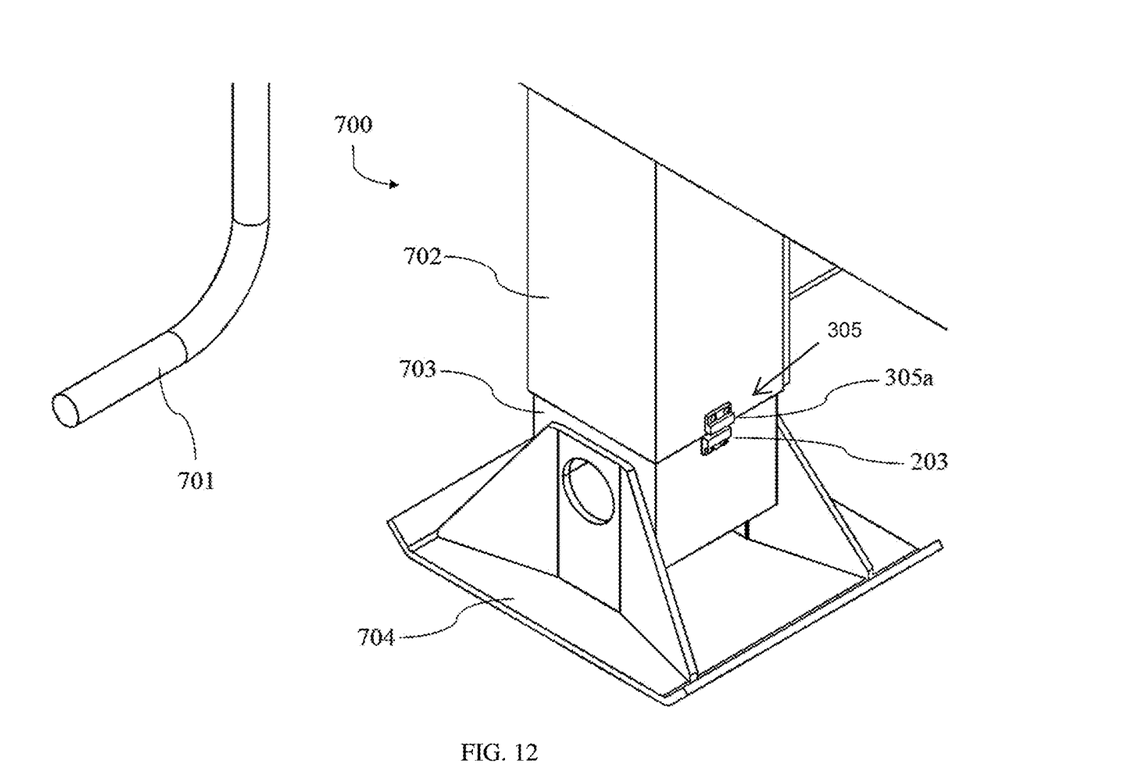
FIG. 12 is an isometric view of a landing gear of a towed portion with the proximity switch to detect the landing gear position.

A method for transmitting the safety signal from the landing gear 700 to the wireless proximity switch 305b (FIG. 10) contacts is shown in FIG. 12. The landing gear 700 consists of two coaxial tubes where an upper tube 702 is fixed to the frame of the towed portion of the vehicle and a lower tube 703 moves up or down when a lever 701 is rotated. When the lower tube 703 is raised to its upper limit, the reed switch 305a detects the magnet 203 which indicates an unsafe condition to release the kingpin from the fifth wheel 101. The lower tube 703 is generally raised to this upper limit for ground clearance when the towed portion is in motion. When the towed portion is separated from the pulling portion, the lower tube 703 must be extended until the foot 704 touches the ground. In the lowered position, the reed switch 305a does not detect the magnet 203 and the safety signal is transmitted wirelessly from the towed portion to the wireless proximity switch 305b (FIG. 10) on the pulling portion causing the wireless proximity switch 305b contacts to close.

In another embodiment, an indicator for the driver may be provided in the safety system 100, which indicates when the landing gear is in its safe position. For example, the indicator may comprise a visual indicator, such as a light, such as an LED, or an audible indicator. In one embodiment, indicators for one safety condition, or one set of safety conditions, can be different than other safety conditions. For example, an audible indicator may be used to indicate disablement of the king pin release solenoid of the fifth wheel, while the indicators for the safety condition of the connectors and for the landing gear may be visual. Or stated differently, visual indicators may be used for inputs to the safety system, such as the landing gear status, while audible indicators may be used for outputs of the safety system, such as the solenoid disablement. Further, the audible indicator may only be triggered when an operator tries to use, for example, the disabled solenoid. Additionally, different colored lights may be used to distinguish between the visual indicators and their respective safety conditions.

One possible configuration of the pulling portion with the safety system 100 is shown in FIG. 11. The ignition power source 104 and the ground 106 of a battery 103 are connected to pins one and two of the multi-pin connector 610 to supply power to the controller 600 while the pulling portion is running. When the vehicle operator attempts to use the kingpin release switch 105, the pulling portion's controller 600 evaluates the state of a parking brake or brakes 107. If the parking brake 107 are engaged, a kingpin release signal is passed to pin three of the multi-pin connector 610. If the controller 600 receives the safety signal from all of its connected proximity switches, the kingpin release signal is passed to pin four of the multi-pin connector 610. The power supplied to a solenoid 108 opens a pneumatic valve to actuate the kingpin release mechanism of the fifth wheel 101. However, if any of the safety logic tests indicate an unsafe condition, that is the vehicle is not in a safe configuration, the solenoid 108 will not receive power from the controller 600 and the kingpin will not be released from the fifth wheel 101.

Given the preceding disclosure, it is important to note that the safety system 100 configurations described are not intended to limit the claims of the disclosure. The devices described in the following claims may be manufactured using various materials and may be used to ensure the safe disconnection of many alternate configurations of the pulling portion and the towed portion. One such alternative configuration, as noted, would exchange the wire harness 400 with a wireless connection method for ease of installation. Another configuration would exchange the controller's 600 stand-alone circuit shown in FIG. 9 with a microcontroller circuit embedded in the pulling portion's OEM controls. The controller 600 may also be located within a power receptacle 102 of the pulling portion. Yet another configuration would use pin three and pin four of the multi-pin connector 610 to control an electric actuator with the solenoid 108 instead of a pneumatic valve for the kingpin release mechanism of the fifth wheel 101. Furthermore, the parking brake 107 status may be evaluated as an additional proximity switch input of the safety signal transmitted to the multi-pin connector 609 instead of the safety signal sent to the multi-pin connector 610; and, the parking brake 107 status may be replaced by a status of a chock 802 described below.

Figure 14:
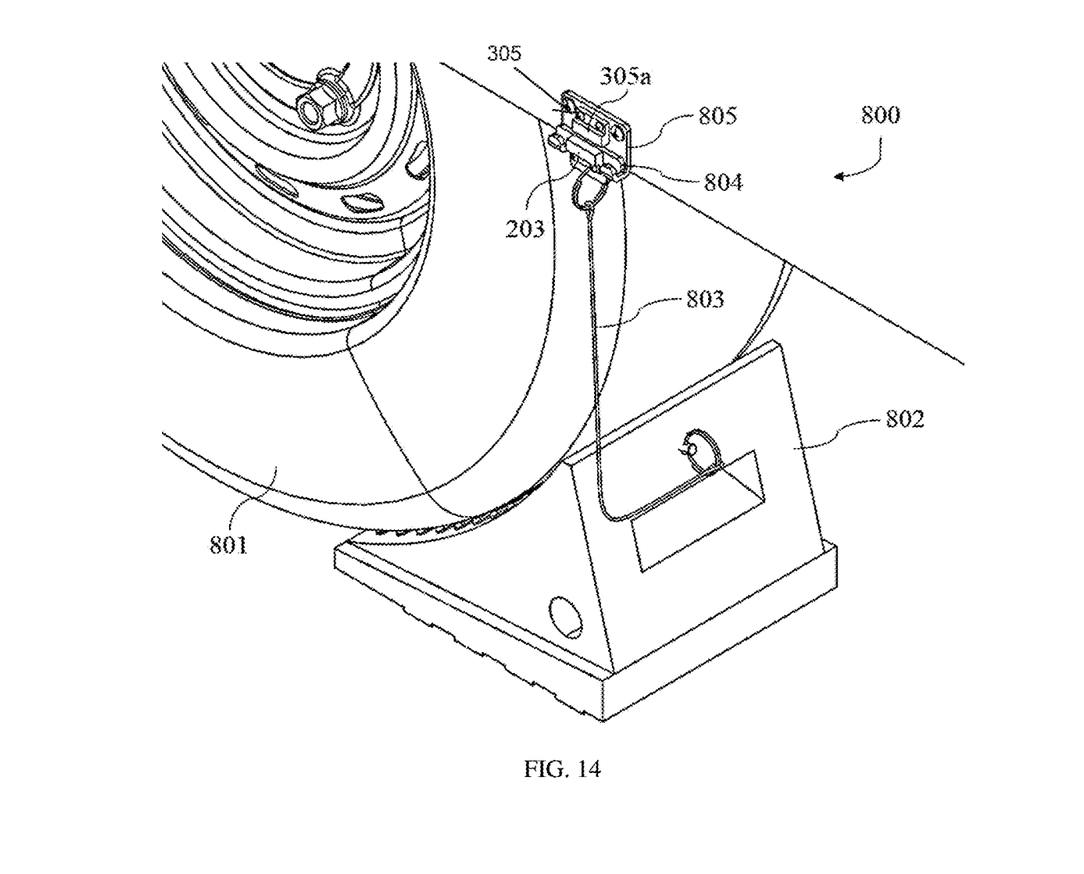
FIG. 14 is an isometric view of a chock with the proximity switch to detect the chock position.

As best seen in FIG. 14, a parking system 800 configuration that monitors the proximity of the chock 802 relative to a wheel 801 of the towed portion may be incorporated into safety system 100. Parking system 800 may include a lanyard 803 attached on end to the chock 802 and a hanger 804 attached at the opposite end. Ac magnet 203 is mounted to the hanger 804 so a reed switch 305a that is adjacent to the magnet 203 when the hanger 804 is hung from a bracket 805 can transmit a safety signal to controller 600 to enable the kingpin release switch 105.

Operation

In operation, the procedure for decoupling the towed portion form the pulling portion of a vehicle with the safety system 100 is very similar to the procedure for decoupling without the safety system 100. The operator must bring the pulling portion to a complete stop, set the parking brake 107, exit the vehicle, extend the landing gear 700, remove the electrical line connector 200 and the pneumatic line connectors 500 from the towed portion, insert and thereby constrain the electrical line connector 200 and the pneumatic line connectors 500 in the respective receptacles 301a, 301b of bracket assembly 300, and release the kingpin from the fifth wheel 101. The difference in operation is that the kingpin release switch 105 will be disabled if any of the electrical line connectors 200 or the pneumatic line connectors 500 are not constrained properly in the bracket assembly 300, and in some embodiments, when the parking brake 107 are not engaged, and in further embodiments when the landing gear 700 is not extended. In that case, when the operator re-enters the cab of the pulling portion and presses the kingpin release switch 105, instead of actuating the kingpin release mechanism with the solenoid 108, the buzzer 601 will produce a warning tone to alert the operator to a safety hazard.

We claim:

1. A vehicle safety system for a pulling portion of a vehicle, the vehicle having a pulling portion and a towed portion, the pulling portion having a plurality of lines, the lines including at least one electrical line and at least two pneumatic lines, the electrical line having an electrical line connector, and the pneumatic lines each having a pneumatic line connector, the vehicle safety system comprising:
 a bracket configured to mount to the pulling portion, said bracket having an exterior forming an electrical line connector-receptacle and a pair of pneumatic line connector receptacles wherein said pneumatic line connector receptacles and said electrical line connector receptacle are integrally formed together with said bracket to constrain the electrical and pneumatic line connectors, respectively, said electrical line connector receptacle being generally vertically oriented when said bracket is mounted to the pulling portion wherein the electrical line connector is held in the electrical line connector receptacle at least by gravity when the electrical line connector is fully inserted into the electrical line connector receptacle, and at least one pneumatic line connector receptacle of said pneumatic line connector receptacles being mounted directly to said electrical line connector receptacle at said exterior of said bracket;
 a proximity switch mounted to said bracket at said exterior adjacent each respective receptacle of said electrical line connector and pneumatic line connector receptacles;
 a magnet for mounting to each of the electrical line connector and the pneumatic line connectors such that the presence of the electrical line connector and the pneumatic line connectors is detected when the magnets align with said proximity sensors when the electrical and pneumatic line connectors are respectively properly constrained in said electrical line connector receptacle and said pneumatic line connector receptacles of said bracket; and
 a controller in communication with said proximity switches and determining whether the vehicle is in a safe configuration based on input from said proximity switches.

2. The vehicle safety system of claim 1, wherein the proximity switches comprise reed switches.

3. The vehicle safety system of claim 1, wherein said electrical line connector receptacle and said pneumatic line connector receptacles are molded together to form a unitary molded bracket.

4. The vehicle safety system of claim 1, wherein said proximity switches each have a pair of wires, further comprising a trough fastened to said bracket at said exterior of said bracket, and-said pairs of wires of said proximity switches being routed on said exterior of said bracket by said-trough to protect said wires from damage.

5. The vehicle safety system of claim 1, wherein said proximity switches each have a pair of wires, further comprising a multi-pin connector mounted to said bracket wherein said wires of said proximity switches terminate in said multi-pin connector, and said multi-pin connector having more pins than said wires to allow for wires of additional devices to be added to said multi-pin connector to expand the inputs to said vehicle safety system.

6. The vehicle safety system of claim 5, wherein said bracket includes a cylindrical body forming said electrical line connector receptacle for receiving said electrical line connector therein, and wherein at least one of said pneumatic line connector receptacles for said pneumatic lines connectors being mounted to or formed with said cylindrical body of said bracket.

7. The vehicle safety system of claim 6, wherein said cylindrical body has a central axis, and said pneumatic line connector receptacles each extending laterally outward from said cylindrical body and from said central axis.

8. The vehicle safety system of claim 2, wherein each of the electrical connector and the pneumatic connectors are made of a non-ferromagnetic material such that the strength of the magnetic fields generated by the magnets are not limited by the electrical line connector and pneumatic line connectors.

9. The vehicle safety system of claim 7, wherein said pneumatic line connector receptacles are mounted to and extend laterally outward from opposed sides of said cylindrical body.

10. A vehicle comprising:
   a pulling portion having a coupler and a plurality of lines, said plurality of lines including at least one electrical line and at least two pneumatic lines, said at least one electrical line having an electrical line connector, and said at least two pneumatic lines each having a pneumatic line connector;
   a towed portion configured to be connected with said pulling portion via said coupler;
   said electrical and pneumatic lines configured to be connected to said towed portion when said towed portion is connected to said pulling portion, and said electrical and pneumatic lines configured to be disconnected from said towed portion and constrained at said pulling portion when said towed portion is to be disconnected from said pulling portion; and
   a safety system comprising:
   a bracket configured to mount to said pulling portion, said bracket having an exterior having an electrical line connector receptacle and a pair of pneumatic line connector receptacles to constrain said electrical and pneumatic line connectors, respectively, and at least one of said pneumatic line connector receptacles mounted to said electrical line connector receptacle at said exterior of said bracket;
   a proximity switch affixed to said bracket at said exterior of said bracket adjacent each respective receptacle of said electrical line connector and pneumatic line connector receptacles; and
   a magnet mounted to each of said electrical line connector and said pneumatic line connectors such that the presence of said electrical line connector and of said pneumatic line connectors is detected when said electrical and pneumatic line connectors are constrained in said electrical line connector receptacle and said pneumatic line connector receptacles of said bracket and when said magnets align with said proximity sensors.

11. The vehicle of claim 10, wherein said towed portion includes a landing gear, said landing gear having a raised state and a lowered state, further comprising a proximity switch to detect the lowered or raised state of said landing gear.

12. The vehicle of claim 11, further comprising an indicator, and said controller in communication with said indicator and powering said indicator to indicate the lowered or raised state of the landing gear.

13. The vehicle of claim 10, further comprising a parking brake and/or a wheel chock, further comprising a proximity switch in communication with said controller to detect the status of said parking brake and/or said wheel chock.

14. The vehicle of claim 13, further comprising an indicator, and said controller in communication with said indicator and powering said indicator to indicate the status of said parking brake and/or said wheel chock.

15. The vehicle of claim 10, wherein said bracket includes a cylindrical body forming said electrical line connector receptacle, and at least one of said pneumatic line connector receptacles mounted directly to or formed with said cylindrical body of said bracket.

16. The vehicle of claim 15, wherein said pneumatic line connector receptacles are mounted to and extend laterally outward from opposed sides of said cylindrical body.

17. The vehicle of claim 10, further comprising a controller in communication with said proximity switches and detecting a safe configuration of said vehicle when each of said respective line connectors of said electrical line connector and said pneumatic line connectors is detected to be properly constrained in said respective receptacles by said proximity switches.

18. The vehicle of claim 17, further comprising a solenoid, said towed portion having a releasable connection to said pulling portion via said coupler, said solenoid operable to release the releasable connection of said towed portion from said coupler, and said controller in communication with said solenoid and operable to control said solenoid to release said towed portion from said coupler when said controller detects said vehicle is in said safe configuration.

19. The vehicle of claim 18, further comprising an indicator, and said controller in communication with said indicator and powering said indicator to indicate said vehicle is in a safe configuration or unsafe configuration.

20. The vehicle of claim 19, wherein said indicator comprises a visual indicator.

21. The vehicle of claim 19, further comprising a release switch for releasing said releasable connection wherein said indicator comprises an audible indicator, and said controller is configured to power said audible indicator when a user operates said release switch when said controller detects said vehicle is in said unsafe configuration.

22. The vehicle of claim 19, wherein said controller powers said indicator to indicate the state of said solenoid to the operator.

23. The vehicle of claim 22, wherein said indicator comprises an audible indicator.

* * * * *

UNITED STATES PATENT AND TRADEMARK OFFICE
CERTIFICATE OF CORRECTION

PATENT NO. : 12,059,935 B1
APPLICATION NO. : 18/528129
DATED : August 13, 2024
INVENTOR(S) : Henry Schwarz and Dan Schwarz It is certified that error appears in the above-identified patent and that said Letters Patent is hereby corrected as shown below:

In the Specification
Column 7
Line 34, "FIG. 0.11" should be --FIG. 11--

In the Claims
Column 10
Claim 1, Line 8, "connector-receptacle" should be --connector receptacle--
Claim 4, Line 50, "and-said" should be --and said--
Claim 4, Line 52, "said-trough" should be --said trough--

Signed and Sealed this
Eighth Day of October, 2024

Katherine Kelly Vidal
*Director of the United States Patent and Trademark Office*